United States Patent [19]

Christian

[11] Patent Number: 4,466,358

[45] Date of Patent: Aug. 21, 1984

[54] SOLID FUEL WARM AIR FURNACE

[76] Inventor: J. Vernon Christian, 2160 Longreen Rd., Kingsport, Tenn. 37660

[21] Appl. No.: 466,319

[22] Filed: Feb. 14, 1983

Related U.S. Application Data

[62] Division of Ser. No. 270,550, Jun. 4, 1981, Pat. No. 4,409,955.

[51] Int. Cl.³ ............................ F23B 5/00; F23H 1/02
[52] U.S. Cl. ..................................... 110/211; 110/214; 126/77; 126/112; 126/163 R
[58] Field of Search ............... 110/210, 211, 212, 213, 110/214; 126/77, 112, 108, 163 R, 163 A, 15 R, 15 A

[56] References Cited

U.S. PATENT DOCUMENTS

| | | | |
|---|---|---|---|
| 2,711,139 | 6/1955 | Martin | 110/211 |
| 2,962,987 | 12/1960 | Herbert | 110/210 |
| 2,993,454 | 7/1961 | Hebert | 110/211 |
| 3,043,245 | 7/1962 | Hebert | 110/210 |
| 3,043,246 | 7/1962 | Hebert | 110/211 |
| 3,043,247 | 7/1962 | Hebert | 110/211 |
| 3,043,248 | 7/1962 | Martin | 110/211 |
| 3,043,249 | 7/1962 | Hebert | 110/211 |
| 3,048,130 | 8/1962 | Morgan | 110/211 |
| 3,496,890 | 2/1970 | Larue | 110/210 |
| 3,509,834 | 5/1970 | Rosenberg | 110/214 |

FOREIGN PATENT DOCUMENTS

924189  4/1973  Canada .............................. 110/210

Primary Examiner—Daniel J. O'Connor
Attorney, Agent, or Firm—Joseph R. Slotnik

[57] ABSTRACT

A solid fuel furnace which includes a housing enclosing a firebox and a heat exchanger chamber. An open grate in the firebox supports solid fuel thereon. Combustion air is admitted to the area below the grate and is preheated and passes upwardly through the grate and fuel and mixes with volatile gases released from the fuel. The air/gas mixture is drawn downwardly through the fuel and exits the firebox through an inlet to an insulated burn-out chamber which is behind the firebox. A metal screen covers the inlet and serves to ignite the air/gas mixture. Hot flue gases exit the burn-out chamber to the heat exchanger chamber.

6 Claims, 9 Drawing Figures

Fig. 5

SOLID FUEL WARM AIR FURNACE

This is a division of application Ser. No. 270,550, filed June 4, 1981, now U.S. Pat. No. 4,409,955.

BACKGROUND OF THE INVENTION

The present invention relates to solid fuel warm air furnaces, and more particularly to a warm air furnace in which inlet combustion air is preheated and selectively dispersed to several locations to promote complete combustion and high efficiency, and wherein a mixture of air and combustible gases in the firebox is ignited at the entrance to a controlled burn-out chamber.

Many currently known warm air furnaces using solid fuel (wood or coal) suffer from hard starting, incomplete combustion, and inefficient heat transfer to outlet air. Thus, inlet air admitted to the furnace is often too cold for complete combustion. This condition is even more acute at low levels of combustion and at start-up when attempting initially to ignite the fuel.

Also, in many furnaces of this type, combustion occurs at random and a significant amount of heat can be lost before the desired heat transfer occurs.

SUMMARY OF THE INVENTION

The present invention overcomes the abovementioned drawbacks by providing a furnace construction in which combustion air admitted to the firebox is preheated and mixed with volatile gases which are distilled and released from the fuel. Part of the combustion air enters the firebox below the fuel and is superheated and passes upwardly and mixes with released volatile gases from the fuel. Another part of the combustion air is preheated and can enter the firebox above the fuel and mix with the superheated air and released volatile gases to help direct the air/gas mixture back down through the fuel. The air/gas mixture is ignited by means at the entrance to an insulated burn-out chamber and then passes through the burn-out chamber and into a heat exchanger which extracts heat therefrom. The mixture of preheated combustion air and gases released from the fuel gases is highly volatile, and since the mixture is ignited at the entrance to the insulated burn-out chamber, it promotes complete combustion and minimal heat loss.

In addition, the furnace of the present invention may employ a forced air injection system which delivers a metered amount of turbulent preheated air to the area adjacent the burn-out chamber inlet. This further enhances ignition of the air/gas mixture at this area particularly during low firing settings for the furnace.

Still further, the furnace of this invention includes a fuel supporting grate which is adjustable to accommodate different fuels (e.g. wood and coal), and which can be shaken to clear ashes therefrom.

Further objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the furnace of this invention comprises a housing, means defining a firebox in the housing, an open grate in the firebox adapted to support solid fuel thereon, combustion air inlet means in the housing and adapted to deliver air to the firebox beneath the grate for heating and passing the combustion air upwardly through the grate and the fuel thereon and mixing the combustion air with combustible gases released from the fuel, the air inlet means also adapted to deliver air to the firebox in a direction downwardly toward the grate, an insulated burn-out chamber having an inlet located at the rear of the firebox adjacent the grate and adapted to draw the mixture of heated air and combustible gases therethrough, an outlet for the burn-out chamber, means at the burn-out chamber inlet for igniting the mixture of air and volatile gases, and heat exchanger means communicated with the burn-out chamber outlet.

In another aspect, the present invention is directed to a furnace comprising a housing, a firebox disposed internally of and spaced from the walls of the housing, an open grate disposed at the bottom of the firebox, a door in the front of the housing for inserting solid fuel into the firebox, means for delivering combustion air to an area beneath the grate for preheating and passing the air upwardly through the fuel and mixing the air with gases released from the fuel during combustion, a burn-out chamber between the firebox and the rear of the housing and insulated from the firebox, the burn-out chamber having an inlet communicated with the firebox and an outlet communicated with a heat exchanger chamber, and exhaust means connected to the heat exchanger chamber for drawing the air/gas mixture from the firebox through the burn-out chamber to the heat exchanger chamber and out the exhaust means, and means at the burn-out chamber inlet for igniting the air/gas mixture.

The accompanying drawings, which are incorporated in and constitute a part of this specification, illustrate preferred embodiments of the invention and, together with the description, serve to explain the principles of the invention.

DESCRIPTION OF THE PREFERRED EMBODIMENT

Reference will now be made in detail to the preferred embodiments of the invention, examples of which are illustrated in the accompanying drawings.

Figure 1:
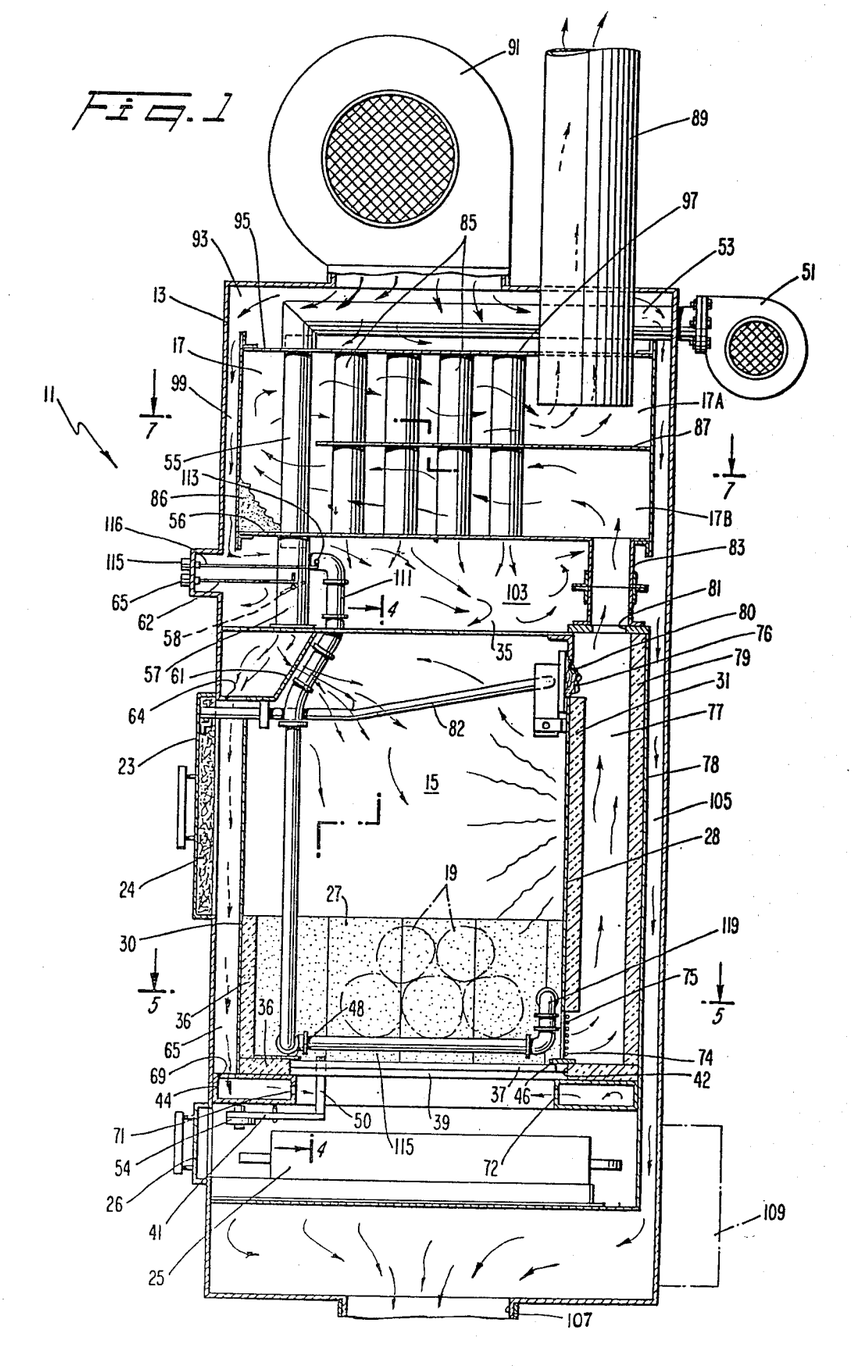
FIG. 1 is a vertical sectional view showing a warm air furnace constructed in accordance with the present invention.
Figure 2:
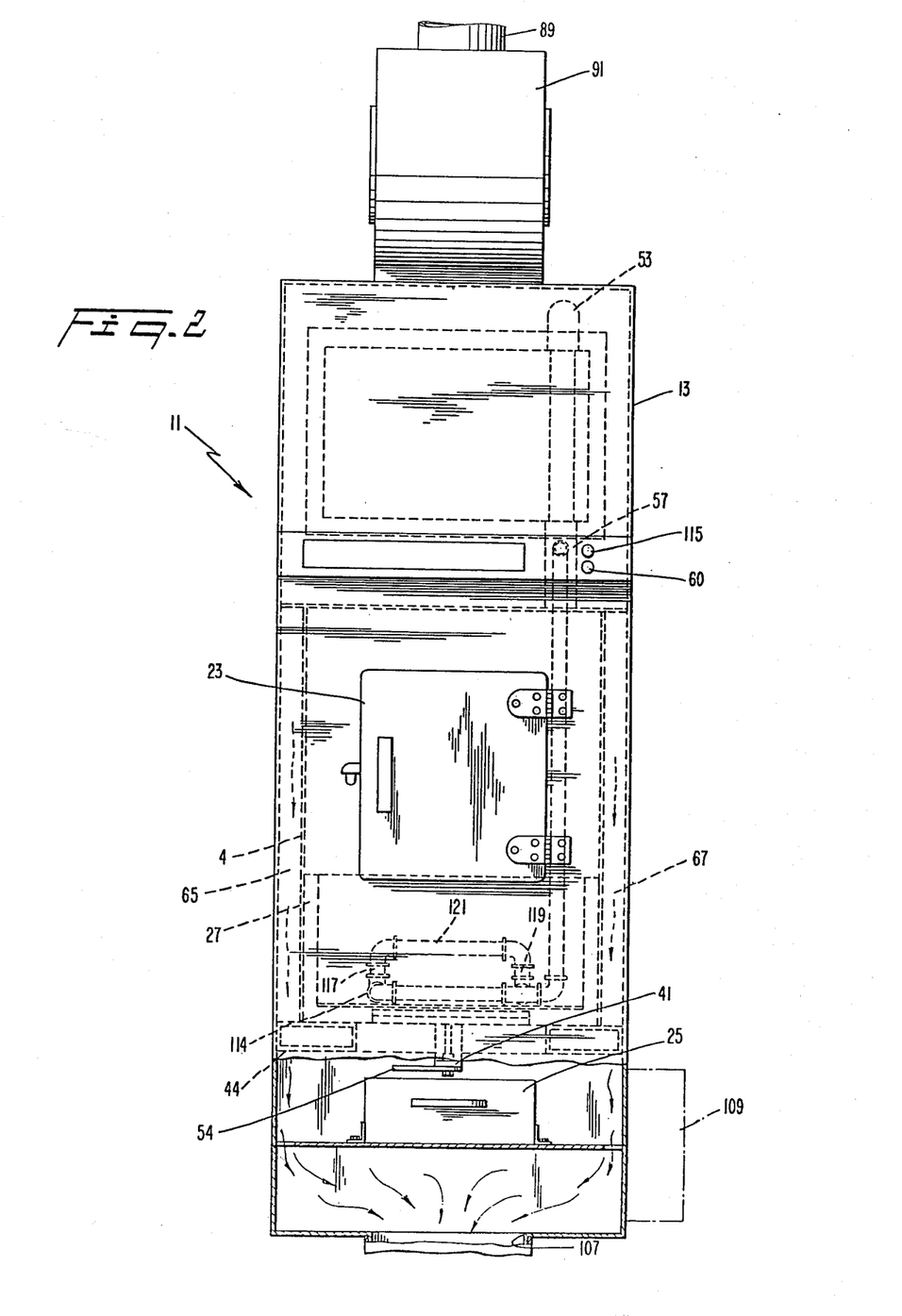
FIG. 2 is an end view of FIG. 1 looking from the left side thereof with parts broken away.

A preferred embodiment of the warm air furnace of the present invention is shown in FIG. 1 and is represented generally by the numeral 11. As embodied herein, the furnace 11 includes an upstanding metal housing 13 which encloses a firebox 15 and a heat exchanger chamber 17. Solid fuel, here shown in phantom as wood logs 19, is disposed within the firebox 15 and above a grate generally indicated at 21, and is adapted to be inserted into the firebox 15 upon opening a door 23 in the front of the housing 13. The door 23 is provided with suitable high temperature insulation 24 on its inner surface so that it does not become hot to the touch. An ash box 25 is disposed beneath the grate 21 and is slidable outwardly of the housing 13 upon opening a door 26 to remove the ashes which are produced by combustion of the fuel 19 and which fall through the grate 21.

As further embodied and shown in FIGS. 1, and 3–5, the firebox 15 is defined by side panels 24, 26, a rear baffle plate 28, and a front plate 30, all of which may be constructed of stainless steel and are spaced from the furnace housing 13. High temperature refractory material (firebrick) 27 lines the inner surfaces of panels 24, 26 and front plate 30. The outer surfaces of rear baffle 28 are lined with high temperature insulation 31 for a purpose hereinafter to be described. The bottom of the firebox 15 is lined with high temperature refractory material 36 which surrounds the grate 21. A top plate 35 forms the top of the firebox 15. Alternatively, the firebox walls may be constructed of a high temperature resistant metal in which case the refractory material can be dispensed with in order to reduce the weight of the furnace.

Figure 3:
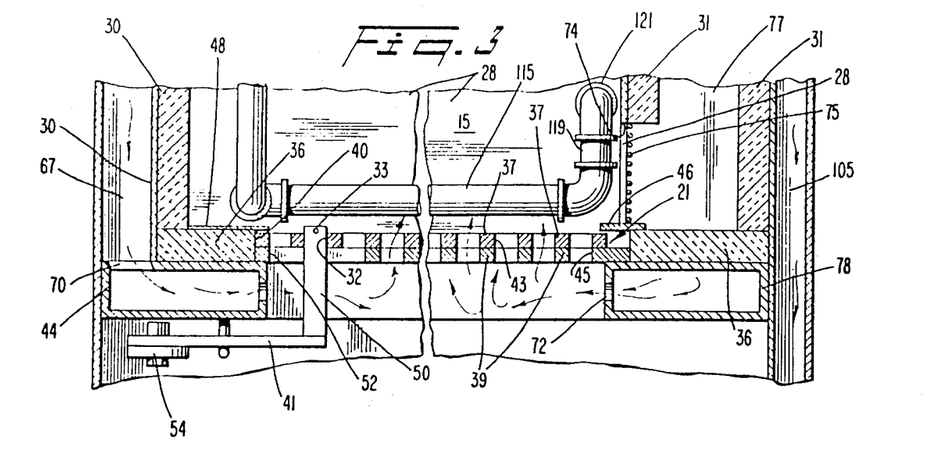
FIG. 3 is an enlarged view of a portion of FIG. 1.
Figure 4:
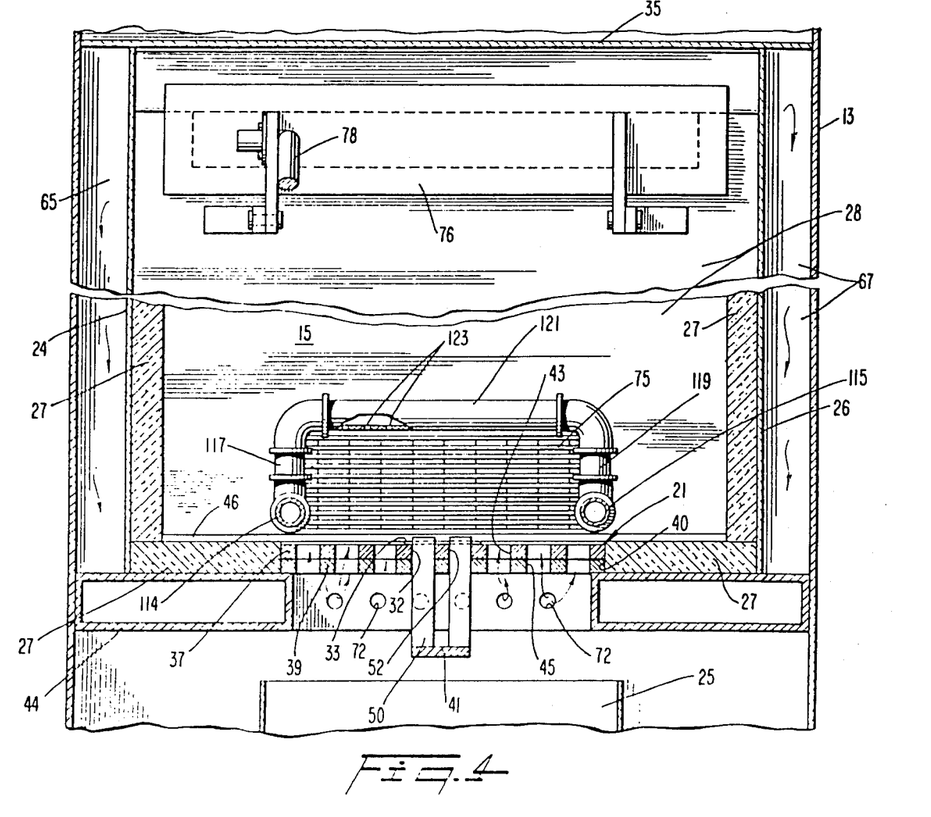
FIG. 4 is an enlarged sectional view of FIG. 1 taken along the line 4—4.

As shown in FIGS. 1, and 3–5, the grate 21 includes a pair of superimposed apertured plates 37, 39 preferably constructed of cast iron and disposed in an opening 40 in the refractory material 27 which lines the bottom of the firebox 15. The lower grate plate 39 is non-movably mounted within the opening 40 and is supported upon a hearth base 44. The upper plate 37 is adapted to slide on the lower plate 39 within the opening 40 and is retained in place on the lower plate 39 by a flange 46 on the rear baffle 28 and a cover plate 48 (FIGS. 3 and 4). An operating lever 41 is fixed to the upper plate 37 by arms 50 which extend upwardly through an elongated opening 52 in the plate 39 and through fitted openings 31, 32 in the plate 37. A roll pin 33 is pressed through openings in the tops of arms 50. A pivot arm 54 attached to the lever 41 is accessible when the door 26 is opened and is manipulated to slide (shake) the upper grate plate 37 back and forth (toward the front and rear of the firebox 15) for the purpose of agitating the solid fuel 19 and clearing the grate 21 of ashes. Also, the upper grate plate 37 can be set to different positions relative to the lower plate 39 in which case apertures 43, 45 in the grate plates 37, 39 can be aligned or misaligned with each other to vary the effective size of the apertures through the plates. In the case of burning coal, large size apertures are desired whereas with wood, small size apertures help to retain heat on the grate.

In accordance with the invention, combustion air inlet means in the housing is adapted to deliver combustion air to the firebox beneath the grate whereby the air is superheated and passes upwardly through the grate and the solid fuel. As embodied herein, and shown in FIG. 1, a forced air fan 51 is mounted at the rear of the housing 13 and delivers atmospheric air to a conduit 53 which extends horizontally into the heat exchanger chamber 17. The conduit 53 is connected to another conduit 55 which extends downwardly through a plate 56 at the bottom of chamber 17 and is connected to a valve conduit 57 which extends downwardly to an opening 38 in the cover plate 35 which forms the top of the firebox 15 (See also FIG. 6). A throttle valve 58 in the valve conduit 57 can either be automatically controlled or manually operated by a control knob 60 mounted on the housing 13 and connected to the valve 58 mounted on the housing by a linkage 62. Manipulation of the valve 58 controls the amount of air from the fan 51 allowed to pass through the valve conduit 57.

Figure 5:
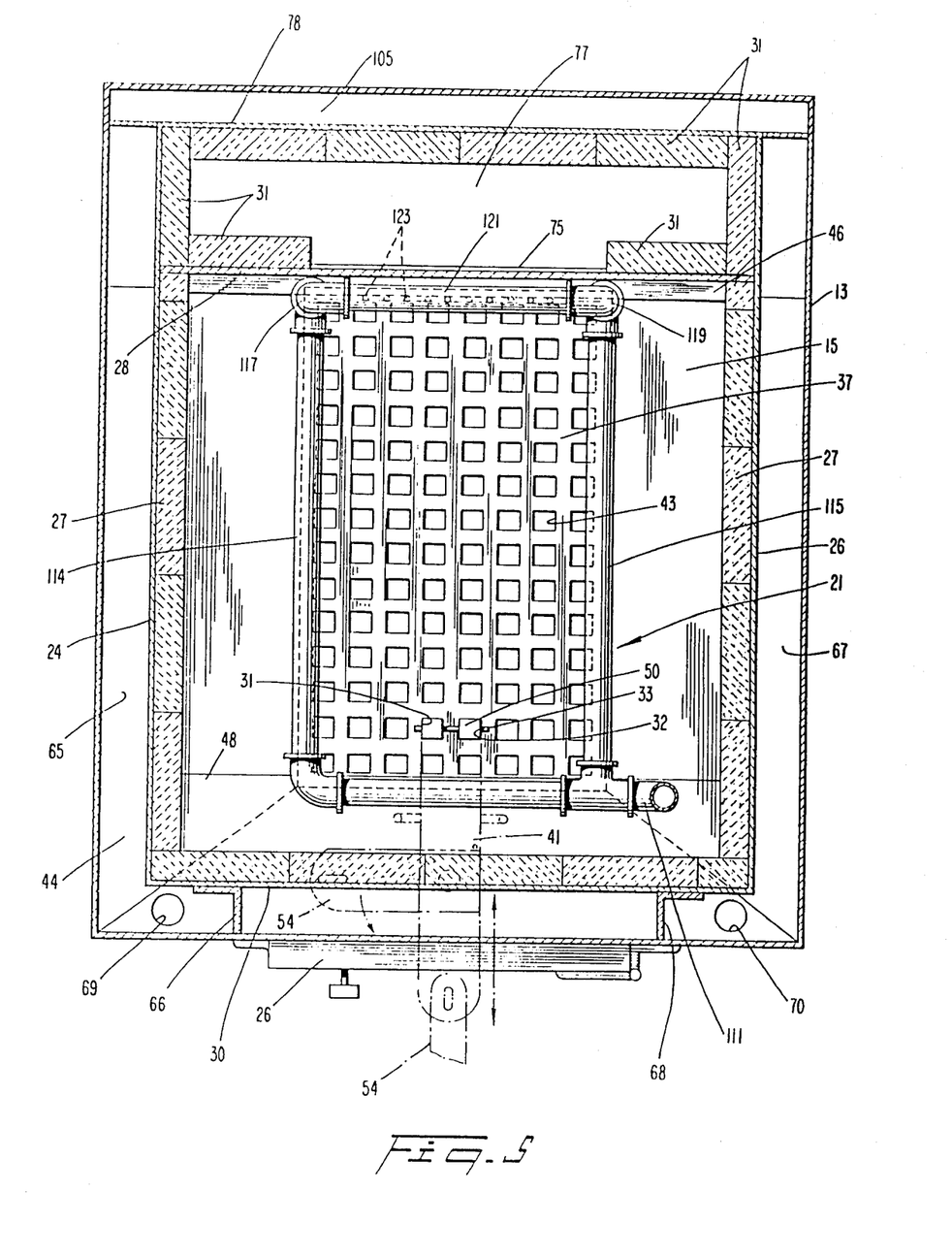
FIG. 5 is an enlarged sectional view of FIG. 1 taken along the line 5—5 and oriented 90°.
Figure 6:
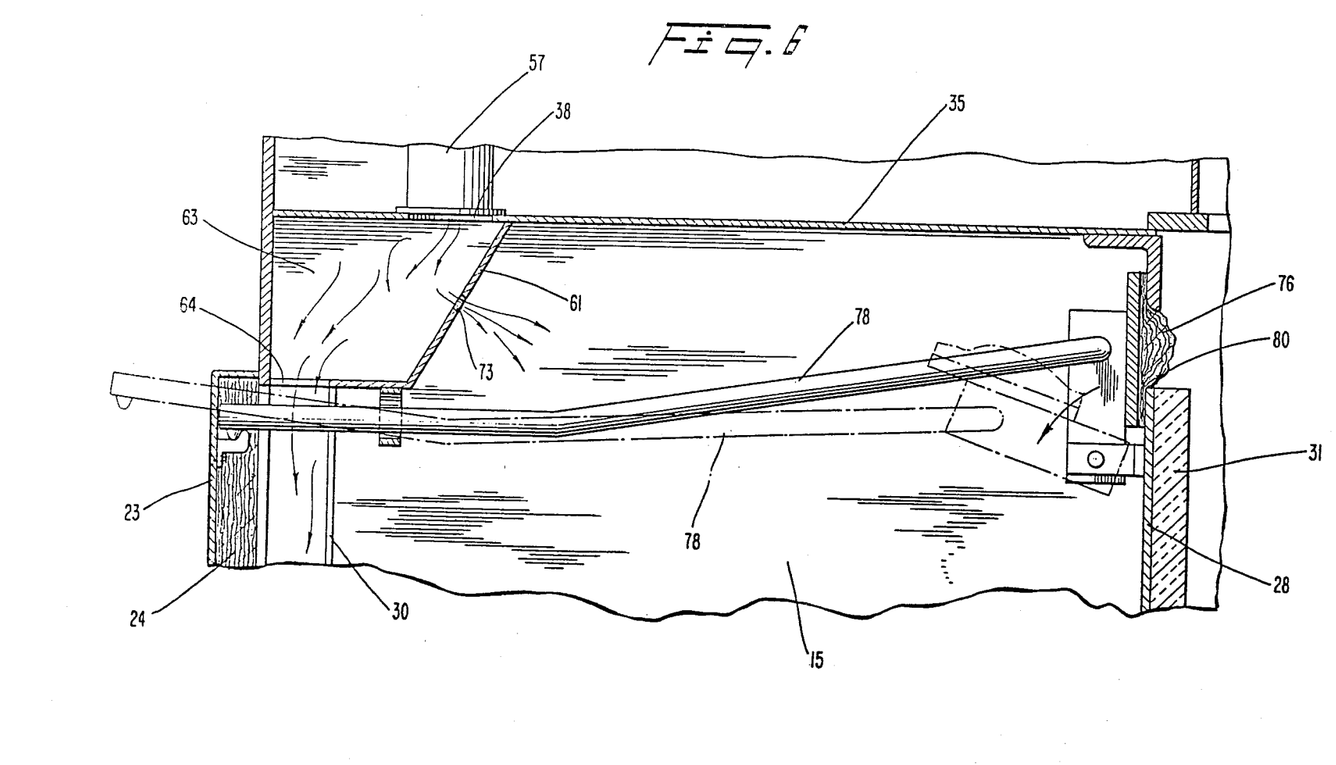
FIG. 6 is an enlarged view of a portion of FIG. 1 and shown with the updraft damper in the closed position in full lines, and in the open position in dot-dash lines.

As seen in FIGS. 1 and 6, the upper end of front baffle plate 30 is joined as by welding to an angled plate 61 which is also joined at its edges to the furnace housing 13 and to the cover plate 35, also by welding, forming an air passage compartment 63 which extends across the front of the housing 13. The valve conduit 57 is communicated with the air passage compartment 65 by the opening 38. Thus, air delivered by the fan 51 to conduits 53, 55, 57 and passing the valve 58 enters the compartment 63. The angled plate 61 is provided with at least two relatively large openings 64, one at each end, which allow air in the compartment 63 to flow into vertical air plenums 65, 67 between the housing 13 and the side panel 24 and front plate 30, and between the housing 13 and the side panel 26 and front plate 30, respectively (see also FIG. 5). Angle members 66, 68 fixed to the front plate 30 and engaging the housing 13 isolate the plenums 65, 67 from the door 23.

As shown in FIGS. 1 and 5, the hearth member 44 is hollow and is provided with a pair of relatively large openings 69, 70 in the area of the plenums 65, 67, respectively. The combustion air passing downwardly through the plenums 65, 67 enters the hearth member 44 through openings 69, 70 and exits through smaller openings 71, 72 below and adjacent the front and rear, respectively, of the grate 21 (See FIGS. 1 and 3). Because of a pressure differential, most of the combustion air exits the openings 71 at the front of the hearth member 44.

The temperature in the firebox 15 can be in the range from about 600° F. to about 700° F. Therefore, as the combustion air exiting opening 71, 72 in the hearth member 44 moves beneath the grate 21, it is superheated to a temperature of from about 250° F. to about 450° F. and passes upwardly through the openings 43, 45 in the grate 21 and through the fuel 19 in the combustion area. This superheated air entering the firebox 15 through the fuel is most beneficial to efficient combustion of the fuel 19. In addition, the heat of combustion evaporates moisture in the fuel which distills and liberates combustible gases from the fuel to mix with the superheated combustion air and pass upwardly into the firebox 15.

As still further embodied herein and shown in FIGS. 1 and 6, a small portion of the air from air passage compartment 63 can pass through a plurality of small openings 73 in the angled plate 61 directly into the firebox 15. This air mixes with the superheated air and combustible gas mixture which is moving upwardly from the fuel 19 into the firebox 15 and helps direct the mixture downwardly in the firebox 15 which mixture is drawn through the hot combustion area on the grate 21. At low firing levels, the pressure in the firebox 15 may exceed the pressure in the air passage compartment 63 in which case some of the air/gas mixture can enter the compartment 63 and reenter the firebox 15 by way of plenums 65, 67 and hearth member 44. This further insures complete combustion in the furnace.

In accordance with the invention, an insulated burn-out chamber having an inlet located at the rear of the firebox and adjacent the grate extends upwardly behind the firebox and has an outlet communicated with the heat exchanger chamber. The air/gas mixture in the firebox drawn downwardly through the combustion area on the grate passes into and through the burn-out chamber and then into the heat exchanger chamber. Means at the burn-out chamber inlet ignites the air/gas mixture as it enters the burn-out chamber.

As embodied herein, an inlet opening 74 is provided in the rear baffle 28 at the rear of the firebox 15 above the grate 21 and communicates the firebox 15 with a burn-out chamber 77 which extends upwardly between the rear baffle 28 and a rear plate 78 and between side panels 24, 26. In addition to the high temperature insulation 31 which lines the outside surface of rear baffle 28, similar insulation 31 lines the facing surface of rear plate 78 and the facing surfaces of side panels 24, 26 in the burn-out chamber 77 to prevent heat loss.

The burn-out chamber inlet opening 74 is covered by a metal screen 75 preferably constructed of stainless steel wire cloth. Being exposed to the heat in firebox 15, the screen 75 is heated and causes the air/gas mixture entering the burn-out chamber to ignite and burn. Also, the screen 75 tends to retain the flame at this area and prevents fuel particles from entering the burn-out chamber.

It will be appreciated that combustion of the fuel on the grate 21 serves mainly to distill the gaseous combustibles in the fuel 19 for release and mixture with the preheated combustion air. Main combustion and that which is responsible for the heat developed by the furnace of my invention is of the air/gas mixture which occurs at the inlet to the burn-out chamber 77.

The hot flue gases which are the product of the burned air/gas mixture passing through the screen 75, can reach a temperature of from about 1600° F. to about 1800° F. and move upwardly through the burn-out chamber 77 and into the heat exchanger chamber 17. As described above, the burn-out chamber 77 is lined with high temperature insulation 31 (to about 2000° F.) to eliminate heat loss as the flue gases move upwardly. The hot flue gases exit the burn-out chamber at an outlet opening 81 and flow through a conduit 83 into the heat exchanger chamber 17.

As seen in FIGS. 1, 4 and 6, an updraft damper 76 is pivoted to the rear baffle 28 and is connected to an arm 82 which extends across the firebox 15 and engages door 23. As long as door 23 is closed, the damper 76 is held in a position where it closes an opening 80 in the rear baffle 28 (see FIGS. 1 and 4 and full lines in FIG. 6). When the door 23 is opened, the damper 76 automatically drops away from rear baffle 28 as shown in dot-dash lines in FIG. 6 and allows hot gases in the firebox 15 to escape directly into the burn-out chamber 77 thereby preventing these gases from blowing out the opening in the front of the housing 13.

As further embodied herein and seen in FIG. 1, a double pass, shell and tube type, heat exchanger is disposed in the chamber 17 and includes a plurality of spaced vertical tubes 85. A horizontal plate 87 separates a major part of the chamber 17 into upper and lower portions 17A, 17B. The hot flue gases exiting the conduit 83 from the burn-out chamber 77 enter the lower chamber portion 17B and are caused to flow in a left hand direction, as seen in FIG. 1, past the lower portions of the tubes 85. The flue gases then move upwardly past the end of plate 87 at the left end of chamber as seen in FIG. 1, and enter the upper cavity portion 17A where they flow in a right hand direction past the upper portions of the tubes 85. This reversal in the flow of flue gases causes fly ash 86 to be trapped in the lower corner of the chamber 17 which can conveniently be removed therefrom through a door (not shown). The flue gases minus a large part of fly ash then exit the chamber 17 through an exhaust pipe 89. If desired, an exhaust fan (not shown) can assist in drawing the flue gases out the exhaust pipe 89.

In accordance with the invention, means is provided to deliver air through the heat exchanger to be heated by the hot flue gases, which air is then discharged through ducting or the like or into an open area for heating purposes. As embodied herein and shown in FIG. 1, a furnace fan 91 is mounted atop the housing 13 and delivers atmospheric air into a chamber 93 above the shell of the heat exchanger. A plate 95 forms part of the heat exchanger shell and separates the chamber 93 and the heat exchanger chamber 17 and has openings which communicate with the tubes 85. A large portion of the air delivered by the fan 91 to the chamber 93 passes through the heat exchanger tubes 85 and is heated by the hot flue gases moving through the chamber 17.

In practice, it has been found that the hot flue gases which enter the heat exchanger chamber 17 at a temperature of from about 1600° F. to about 1800° F. exit the chamber 17 at a temperature of from about 180° F. to about 380° F. Thus, the double pass, shell and tube heat exchanger is very efficient in heat transfer.

Figures 7, 8:
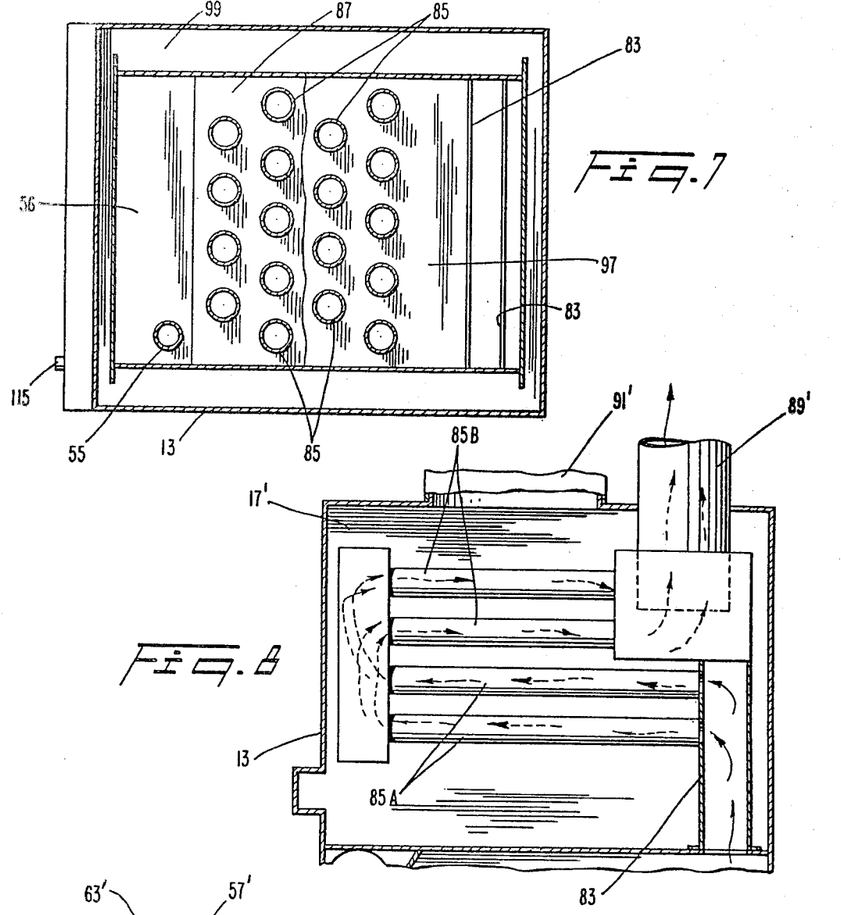
FIG. 7 is a sectional view of FIG. 1 taken along the line 7—7.
FIG. 8 is a view showing a modified form of heat exchanger.

In addition, a small portion of the air delivered from the furnace fan 91 to chamber 93 passes downwardly through a space 99 between the housing 13 and the walls of the heat exchange chamber 17 which also form the shell of the heat exchanger (see FIGS. 1 and 7). This air is also heated and importantly reduces the loss of heat which can occur from the heat exchanger chamber 17 through the walls of housing 13. Therefore, all of the air from the fan 91 is heated and enters a chamber 103 between the firebox 15 and the heat exchanger chamber 17. Additional heating of this air occurs in chamber 103 because of its juxtaposition to the firebox 15 and this heated air passes downwardly through a passage 105 which is between rear plate 78 and the wall of housing 13 behind the burn-out chamber 77 (see FIGS. 1 and 5). The heated air can then exit through the bottom of the furnace or to the rear or either side and be delivered to suitable duct work or into an open area. A suitable bottom opening is shown at 107 and a rear take-off is shown in dot-dash lines at 109 in FIG. 1. The bottom opening has been found useful in mobile home installations, while the rear take off is better when using the furnace of this invention as a primary or secondary heat source in central heating systems.

In accordance with the invention, the furnace of the present invention employs a forced air injection system which delivers a metered amount of turbulent preheated air directly to the firebox adjacent the burn-out chamber inlet. As embodied herein and shown in FIG. 1, the forced air injection system includes a pipe conduit 111 connected to the valve conduit 57 upstream of the main combustion air throttle valve 58. A suitable valve such as a butterfly valve 113 is provided at the inlet from the valve conduit 57 to the pipe conduit 111 and is operated either manually or automatically by a control knob 115 located on the furnace housing 13 and connected to the valve 113 by a linkage 116.

When the valve 113 is opened, a controlled amount of air is drawn from the conduit 57 and passes through the pipe conduit 111. The pipe conduit 111 extends downwardly through the firebox 15 to a position immediately above and in front of the grate 21, and has two branch arms 114, 115 which extend rearwardly above the grate 21 and are joined to short vertical pipes 117, 119 at the rear of the firebox (see FIG. 5). The tops of the vertical pipes 117, 119 are joined by a transverse header pipe 121 which has a plurality of openings 123 facing downwardly (see FIG. 4). The air passing through pipes 111, 114, 115, 117, 118 and 121 and ejected through the openings 123 has, of course, been preheated in its passage through the firebox 15 and exits the pipe openings 123 in turbulent fashion in an area closely adjacent to the ignition screen 75 at burn-out chamber inlet opening 74. Some of the fuel 19 and hot coals are in contact with the branch pipe arms 114, 115, and the juxtaposition of all the piping to the firebox 15 insures that the air ejected through openings 123 is heated. In the disclosed embodiment, this air is heated to from about 1000° F. to about 1400° F. This preheated turbulent air serves to enhance combustion (ignition) at the screen 75 and is particularly advantageous in smoke reduction when operating the furnace at low firing settings. Also of importance is that this air can be of a continuous flow since it is not directed against the fuel and immediately evacuated via draft the air does not effect the rate of burning.

The disclosed preferred embodiment shows the forced air injection system as delivering heated turbulent air within the firebox adjacent the inlet 74 to the burn-out chamber 77. It will also be appreciated that this air can be delivered inside the burn-out chamber 77 as well and that a separate source can be provided for this air if desired.

FIG. 8 depicts a modified form of heat exchanger. In this version, the hot flue gases pass through two sets of horizontal tubes 85A, 85B, first in a left hand direction and then toward the right in heat exchanger chamber 17'. Atmospheric air from furnace fan 91' enters the chamber 17' and is heated as it passes over the outside of the tubes 85A, 85B. Flue gases exit the chamber 171 through exhaust pipe 89'.

Figure 9:
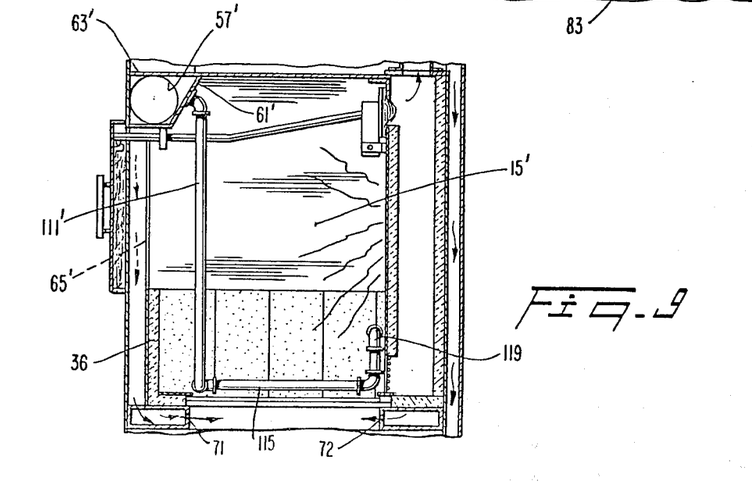
FIG. 9 is a partial view, similar to FIG. 1, showing a simplified form of air inlet and forced air injection system.

In FIG. 9, the means for supplying combustion air to air passage compartment 63' includes a horizontal entry through a conduit 57' at one end of the compartment 63' to which a fan (not shown) can be connected. The forced air injection piping 111' is connected to the compartment 63' through an opening in the angled plate 61'. Suitable valving (not shown) is provided to control delivery of combustion air to vertical plenums 65' and piping 111'.

By the foregoing, there has been described a preferred embodiment and modifications of the present invention. It will be apparent to those skilled in the art that other additions, substitutions, modifications and omissions may be made in the furnace of the present invention without departing from the scope or spirit of the invention. Thus, it is intended that the present invention cover the above additions, substitutions, modifications and omissions of this invention provided they come within the scope of the patented claims and their equivalents.

What is claimed is:

1. A furnace comprising a housing, a firebox disposed internally of and spaced from the walls of said housing, an open grate disposed at the bottom of said firebox, a door in the front of said housing for inserting solid fuel into said firebox, means for delivering combustion air to an area beneath said grate for preheating and causing said air to pass upwardly through said solid fuel and to mix with gases released from said fuel during combustion, a burn-out chamber between said firebox and the rear of said housing and insulated from said firebox, said burn-out chamber having an inlet communicated with said firebox and an outlet communicated with a heat exchanger chamber, exhaust means connected to said heat exchanger chamber for drawing said air/gas mixture from said firebox through said burn-out chamber to said heat exchanger chamber and out said exhaust means, and means at said burn-out chamber inlet and heated by heat in the firebox for igniting said air/gas mixture, said igniting means being operable to retain the flame from ignition of said air/gas mixture, whereby to promote complete combustion of said air/gas mixture in said burn-out chamber.

2. A furnace as claimed in claim 1, means for delivering turbulent preheated air adjacent said burn-out chamber inlet for enhancing ignition of said air/gas mixture.

3. A furnace as claimed in claim 2, said turbulent air delivery means including means passing through said firebox adjacent said grate, whereby burning fuel in said firebox heats said air delivered through said delivery means.

4. A furnace as claimed in claim 2, said turbulent air delivery means delivering air within said firebox adjacent said ignition means.

5. A furnace as claimed in claim 1, said igniting means being a metal screen covering said inlet opening to said burn-out chamber.

6. A furnace as claimed in claim 5, said metal screen being constructed of stainless steel wire cloth and operable to prevent fuel particles from entering the burn-out chamber.

* * * * *